(12) United States Patent
Smith et al.

(10) Patent No.: US 6,924,249 B2
(45) Date of Patent: *Aug. 2, 2005

(54) DIRECT APPLICATION OF CATALYSTS TO SUBSTRATES VIA A THERMAL SPRAY PROCESS FOR TREATMENT OF THE ATMOSPHERE

(75) Inventors: John R. Smith, Birmingham, MI (US);
Michel Farid Sultan, Troy, MI (US);
Ming-Cheng Wu, Troy, MI (US);
Zhibo Zhao, Ann Arbor, MI (US);
Bryan A. Gillispie, Warren, MI (US)

(73) Assignee: Delphi Technologies, Inc., Troy, MI (US)

( * ) Notice: Subject to any disclaimer, the term of this patent is extended or adjusted under 35 U.S.C. 154(b) by 228 days.

This patent is subject to a terminal disclaimer.

(21) Appl. No.: 10/263,269

(22) Filed: Oct. 2, 2002

(65) Prior Publication Data

US 2004/0065391 A1 Apr. 8, 2004

(51) Int. Cl.[7] .............. B01J 23/00; B01J 23/72; B01J 23/48; B05D 1/08; C23C 4/10
(52) U.S. Cl. ............ 502/335; 502/305; 502/306; 502/313; 502/317; 502/319; 502/325; 502/326; 502/331; 502/337; 502/338; 502/339; 502/343; 502/344; 502/347; 427/446; 427/449; 427/453; 427/455; 427/456
(58) Field of Search .................. 502/305–306, 502/313, 317, 319, 325, 326, 331, 337–339, 343, 344, 347; 427/446, 449, 453, 455, 456

(56) References Cited

U.S. PATENT DOCUMENTS

| | | | |
|---|---|---|---|
| 2,861,900 A | 11/1958 | Smith et al. | |
| 3,996,398 A | 12/1976 | Manfredi | |
| 4,416,421 A | 11/1983 | Browning et al. | |
| 5,217,746 A | 6/1993 | Lenling et al. | |
| 5,271,188 A | * 12/1993 | Yoshikawa | 451/80 |

(Continued)

FOREIGN PATENT DOCUMENTS

| | | |
|---|---|---|
| DE | 42 36 911 | 12/1993 |
| DE | 199 59 515 | 6/2001 |
| DE | 100 37 212 | 1/2002 |
| DE | 101 26 100 | 12/2002 |
| EP | 1 160 348 | 12/2001 |
| EP | 1245854 A2 | 2/2002 |
| WO | 98/22639 | 5/1998 |
| WO | 02/052064 | 1/2002 |

OTHER PUBLICATIONS

European Search Report dated Jan. 29, 2004 and it's Annex.
Hoton How, et al; *Development of High–Sensitivity Fluxgate Magnetometer Using Single–Crystal Yttrium Iron Garnet Thick Film as the Core Material*, ElectroMagnnetic Applications, Inc., no month/year.

(Continued)

*Primary Examiner*—J. A. Lorengo
*Assistant Examiner*—Patricia L. Hailey
(74) *Attorney, Agent, or Firm*—Scott A. McBain (57) ABSTRACT

Disclosed is a method for direct application of a catalyst to a substrate for treatment of atmospheric pollution including ozone. The method includes applying a catalytic metal to a substrate utilizing a thermal spray process. The process can be utilized to apply a base metal such as copper to a substrate and the base metal becomes the catalytically active oxide during and following application to the substrate. This system replaces a multi-step process within a single step process to provide a catalytically active surface that can be utilized to reduce ground level ozone and other atmospheric pollutants.

33 Claims, 8 Drawing Sheets

U.S. PATENT DOCUMENTS

| | | | | |
|---|---|---|---|---|
| 5,296,667 A | * | 3/1994 | Marantz et al. | 219/121.47 |
| 5,328,751 A | | 7/1994 | Komorita et al. | |
| 5,362,523 A | | 11/1994 | Gorynin et al. | |
| 5,465,627 A | | 11/1995 | Garshelis | |
| 5,493,921 A | | 2/1996 | Alasafi | |
| 5,520,059 A | | 5/1996 | Garshelis | |
| 5,585,574 A | | 12/1996 | Sugihara et al. | |
| 5,683,615 A | | 11/1997 | Munoz | |
| 5,706,572 A | | 1/1998 | Garshelis | |
| 5,708,216 A | | 1/1998 | Garshelis | |
| 5,725,023 A | | 3/1998 | Padula | |
| 5,887,335 A | | 3/1999 | Garshells | |
| 5,889,215 A | | 3/1999 | Kilmartin et al. | |
| 5,907,105 A | | 5/1999 | Pinkerton | |
| 5,993,565 A | | 11/1999 | Pinkerton | |
| 6,047,605 A | | 4/2000 | Garshelis | |
| 6,098,741 A | | 8/2000 | Gluf | |
| 6,119,667 A | | 9/2000 | Boyer et al. | |
| 6,139,913 A | * | 10/2000 | Van Steenkiste et al. | 427/191 |
| 6,145,387 A | | 11/2000 | Garshelis | |
| 6,149,736 A | | 11/2000 | Sugihara | |
| 6,159,430 A | | 12/2000 | Foster | |
| 6,189,663 B1 | | 2/2001 | Smith et al. | |
| 6,260,423 B1 | | 7/2001 | Garshelis | |
| 6,261,703 B1 | | 7/2001 | Sasaki et al. | |
| 6,277,448 B2 | * | 8/2001 | Strutt et al. | 427/452 |
| 6,283,859 B1 | | 9/2001 | Carlson et al. | |
| 6,289,748 B1 | | 9/2001 | Lin et al. | |
| 6,338,827 B1 | | 1/2002 | Nelson et al. | |
| 6,344,237 B1 | | 2/2002 | Kilmer et al. | |
| 6,374,664 B1 | | 4/2002 | Bauer | |
| 6,402,050 B1 | | 6/2002 | Kashirin et al. | |
| 6,422,360 B1 | | 7/2002 | Oliver et al. | |
| 6,424,896 B1 | | 7/2002 | Lin | |
| 6,442,039 B1 | | 8/2002 | Schreiber | |
| 6,446,857 B1 | | 9/2002 | Kent et al. | |
| 6,465,039 B1 | | 10/2002 | Pinkerton et al. | |
| 6,485,852 B1 | | 11/2002 | Miller et al. | |
| 6,488,115 B1 | | 12/2002 | Ozsoylu | |
| 6,490,934 B2 | | 12/2002 | Garshelis | |
| 6,511,135 B2 | | 1/2003 | Ballinger et al. | |
| 6,537,507 B2 | | 3/2003 | Nelson et al. | |
| 6,551,734 B1 | | 4/2003 | Simpkins et al. | |
| 6,553,847 B2 | | 4/2003 | Garshelis | |
| 6,559,094 B1 | * | 5/2003 | Korotkikh et al. | 502/326 |
| 6,615,488 B2 | | 9/2003 | Anders | |
| 6,623,704 B1 | | 9/2003 | Roth | |
| 6,623,796 B1 | | 9/2003 | Van Steenkiste et al. | |
| 6,624,113 B2 | | 9/2003 | Labarge et al. | |
| 6,630,257 B2 | * | 10/2003 | Ye et al. | 428/698 |
| 6,682,774 B2 | * | 1/2004 | Smith et al. | 427/180 |
| 6,743,468 B2 | * | 6/2004 | Fuller et al. | 427/191 |
| 2002/0071906 A1 | | 6/2002 | Rusch | |
| 2002/0073982 A1 | | 6/2002 | Shaikh et al. | |
| 2002/0102360 A1 | | 8/2002 | Subramanian et al. | |
| 2002/0110682 A1 | | 8/2002 | Brogan | |
| 2002/0112549 A1 | | 8/2002 | Cheshmehdoost et al. | |
| 2002/0182311 A1 | | 12/2002 | Leonardi et al. | |
| 2003/0039856 A1 | | 2/2003 | Gillispie et al. | |
| 2003/0190414 A1 | | 10/2003 | VanSteenkiste | |
| 2003/0219542 A1 | | 11/2003 | Ewasyshyn et al. | |
| 2004/0065171 A1 | * | 4/2004 | Hearley et al. | 75/255 |

OTHER PUBLICATIONS

Ripka, et al; *Microfluxgate Sensor with Closed Core*, submitted for Sensors and Actuators, Version 1, Jun. 17, 2000.

Henriksen, et al; *Digital Detection and Feedback Fluxgate Magnetometer*, Meas. Sci. Technol. 7 (1996) pp. 897–903, no month.

Cetek 930580 Compass Sensor, *Specifications*, Jun. 1997.

Geyger, *Basic Principles Characteristics and Applications*, Magnetic Amplifier Circuits, 1954, pp. 219–232, no month.

I.J. Garshelis, et al; *A Magnetoelastic Torque Transducer Utilizing a Ring Divided into Two Oppositely Polarized Circumferential Regions*; MMM 1995; Paper No. BB–08, no month.

I.J. Garshelis, et al; *Development of a Non–Contact Torque Transducer for Electric Power Steering Systems*; SAE Paper No. 920707; 1992; pp. 173–182, no month.

Boley, et al; *The Effects of Heat Treatment on the Magnetic Behavior of Ring—Type Magnetoelastic Torque Sensors*; Proceedings of Sicon '01; Nov. 2001.

J.E. Snyder, et al., *Low Coercivity Magnetostrictive Material with Giant Piezomagnetic d33*, Abstract Submitted for the Mar. 99 Meeting of the American Physical Society, no month.

McCune, et al; *An Exploration of the Cold Gas–Dynamic Spray Method . . .* ; Proc. Nat. Thermal Spray Conf. ASM Sep. 1995, no month.

Pavel Ripka, et al; *Pulse Excitation of Micro–Fluxgate Sensors*, IEEE Transactions on Magnetics, vol. 37, No.4, Jul. 2001, pp. 1998–2000.

Trifon M. Liakopoulos, et al; *Ultrahigh Resolution DC Magnetic Field Measurements Using Microfabricated Fluxgate Sensor Chips*, University of Cincinnati, Ohio, Center for Microelectronic Sensors and MEMS, Dept of ECECS pp. 630–631, no month/year.

Derac Son, *A New Type of Fluxgate Magnetometer Using Apparent Coercive Field Stregth Measurement*, IEEE Transactions on Magnetics, vol. 25, No. 5, Sep. 1989, pp. 3420–3422.

O. Dezauri, et al; *Printed Circuit Board Integrated Fluxgate Sensor*, Elsevier Science S. A. (2000) Sensors and Actuators, pp. 200–203, no month.

How, et al; *Generation of High–Order Harmonics in Insulator Magnetic Fluxgate Sensor Cores*, IEEE Transactions on Magnetics, vol. 37, No. 4, Jul. 2001, pp. 2448–2450.

Moreland, *Fluxgate Magnetometer*, Carl W. Moreland, 199–2000, pp. 1–9, no month /year.

Ripka, et al; *Symmetrical Core Improves Micro–Fluxgate Sensors*, Sensors and Actuators, Version 1, Aug. 25, 2000, pp. 1–9.

\* cited by examiner

DIRECT APPLICATION OF CATALYSTS TO SUBSTRATES VIA A THERMAL SPRAY PROCESS FOR TREATMENT OF THE ATMOSPHERE

TECHNICAL FIELD

The present invention is directed to a method and apparatus for treatment of the atmosphere, and more particularly, to a method for direct application of catalysts to a substrate via a thermal spray process and its use to treat atmospheric pollution.

BACKGROUND OF THE INVENTION

Controlling atmospheric pollution is a concern of increasing importance as the levels of various atmospheric pollutants continue to increase. One primary pollutant of concern is ozone. Various components in the atmosphere can lead to the production of ozone and these compounds include those produced by internal combustion engines. Volatile organic compounds and oxides of nitrogen released into the atmosphere are two primary precursors that lead to formation of ozone in the air via photocatalysis. Most pollution control measures are directed toward removing such ozone precursors at the emission sources.

Recently, a new technology has emerged for treatment of ozone at the ground level utilizing vehicle heat exchangers. Examples of this technology can be found in U.S. Pat. Nos. 6,214,303; 6,212,882; 6,200,542; 6,190,627, and 5,204,302. These patents disclose methods for treating atmospheric pollutants by contacting the atmosphere with a catalytic composition on the surface of a substrate. The difficulty with this current technology is that getting the catalytically active compounds to adhere to the substrate requires the use of complicated binders, adhesive layers, and complex surface treatments. These procedures generally involve immersing the entire heat exchanger in a series of coating slurries to obtain a catalytically active surface. The equipment for carrying out these procedures is large and there is the additional difficulty of treating the residue. Finally, treatment of vehicle heat exchangers by these methods can tend to lead to a reduction in the heat exchange efficiency of the heat exchanger, which is undesirable.

It would be advantageous to provide a method for application of catalytically active substances to a substrate that is simple, can be incorporated easily into existing production facilities, is a one-step process, and that can be utilized to apply catalytically active substances to a variety of substrates in addition to heat exchangers.

SUMMARY OF THE INVENTION

In one embodiment, the present invention is a method of forming a catalytically active surface on a substrate for treatment of atmospheric pollution comprising the steps of: providing a feedstock of at least one catalytic metal to a thermal spray system, the thermal spray system forming a molten catalytic metal; and applying the molten catalytic metal from the thermal spray system directly onto a substrate material surface, the molten catalytic metal forming a direct bond to the substrate and forming a catalytically active layer on the substrate material surface, wherein the catalytically active layer is capable of catalyzing the conversion of at least one of ozone, hydrocarbons, or carbon monoxide to oxygen, water, and carbon dioxide, respectively, and wherein the surface and the substrate material are free from binders of the molten catalytic metal.

BRIEF DESCRIPTION OF THE DRAWINGS

The present invention will now be described, by way of example, with reference to the accompanying drawings, in which.

DESCRIPTION OF THE PREFERRED EMBODIMENT

The present invention comprises a method for formation of a catalytically active layer directly on a substrate for treatment of atmospheric pollution. In the method a thermal spray process is used to directly apply a catalytic metal to the substrate without the use of auxiliary binders or other adhesives. During application and after application, the catalytic metal forms a catalytically active layer on the substrate material surface. This catalytically active layer is capable of catalyzing the conversion of at least one of ozone, hydrocarbons, or carbon monoxide to oxygen, water, and carbon dioxide, respectively. The method can be utilized to apply the catalytically active surface to a wide variety of substrates including heat exchangers for vehicles.

Thermal spray methods are well known in the art and have been described extensively. The most common types of thermal spray systems include: flame spray; detonation gun spray; high-velocity oxyfuel; twin wire arc; and air plasma. All thermal spray systems involve heating the feedstock to a temperature above its melting point and then entraining the molten feedstock in a gas stream to accelerate it to a desired velocity. The molten entrained feedstock is then directed toward a desired substrate surface. When the feedstock and the substrate are both metals a direct metallic bond can be formed between them. In the present invention, the preferred types of thermal spray systems utilized include high-velocity oxyfuel, twin wire arc, and air plasma spray. The more preferred thermal spray systems are the high-velocity oxyfuel and air plasma spray systems. Because the air plasma thermal spray systems can achieve higher feedstock temperatures they are preferred when the feedstock utilized in the present invention comprises a metal oxide instead of the pure metal.

Regardless of the thermal spray system that is utilized in the present invention there are several general parameters that apply to any system selected. The first general parameter is to select a shortened stand-off distance between the thermal spray system applicator and the surface being coated to increase heating of the surface and the growing layer of catalytic metal thereby enhancing formation of the catalytic metal's oxide forms. The second general principle is to have the temperature of the thermal spray system be sufficiently higher than the melting temperature of the catalytic metal to additionally promote formation of metal oxides. The final general principal is to adjust the thermal spray system to increase the speed of the molten catalytic metal to enhance its adhesion to the substrate surface. In utilizing the present invention the goal is to promote the formation of metal oxides in the catalytic metal that is being applied to a surface particularly at the outer layers of the applied catalytic metal. This oxide formation enhances its ability to catalyze the beneficial reactions for cleaning of the atmosphere. Clearly, when a metal oxide is being sprayed, the goal is to ensure that it remains in this form after application.

The feedstock utilized in the present invention comprises the selected catalytic metal or metals. In the specification and the claims a catalytic metal is meant to include both the metal and any of its oxides that are either inherently catalytically active or that become catalytically active as a result of the process of the present invention. In the present invention the suitable catalytic metals comprise: manganese, copper, nickel, iron, chromium, zinc, palladium, platinum, rhodium, ruthenium, silver, gold, oxides of these metals, and mixtures thereof. When the catalytic metal is supplied as a powder, the particles used in the present invention preferably have an average nominal diameter of from 5.0 to 250.0 microns, more preferably from 15.0 to 120.0 microns, and most preferably from 25.0 to 75.0 microns. When a twin arc thermal spray system is used preferably the wires have a diameter of from $1/16$ to $4/16$ of an inch. These metals and their oxides are known to be catalytically active, particularly in the conversion of ozone, hydrocarbons, or carbon monoxide to oxygen, water and carbon dioxide, respectively.

In accordance with the present invention, the thermal spray system chosen is utilized to apply the molten catalytic metal to a thickness of from 10.0 to 50.0 microns onto the selected substrate material surface. The selected catalytic metal in the feedstock is heated to a temperature preferably of from 0.0 to 400.0° C. above the melting point of the feedstock to form the molten catalytic metal, more preferably it is heated to a temperature of from 0.0 to 250.0° C. above the melting point of the feedstock, and most preferably to a temperature of from 0.0 to 100.0° C. above the melting point of the feedstock. It is preferred that the molten catalytic metal be applied to the substrate material surface at an angle of from 0.0 to 80.0 degrees with the angle measured relative to a line drawn normal to the substrate material surface. More preferably, the molten catalytic metal is applied to the substrate material surface at an angle of from 0.0 to 50.0 degrees and most preferably at an angle of from 0.0 to 30.0 degrees relative to a line drawn normal to the substrate material surface. In a preferred embodiment, the stand-off distance is from 10.0 to 500.0 millimeters, more preferably a stand-off distance of from 30.0 to 100.0 millimeters, and most preferably a stand-off distance of from 30.0 to 80.0 millimeters. It is preferred that the molten catalytic metal exiting from the thermal spray system be accelerated to a velocity of from 50.0 to 900.0 meters per second, and more preferably to a velocity of from 200.0 to 900.0 meters per second, and most preferably to a velocity of from 400.0 to 600.0 meters per second. The feedstock is preferably supplied to the thermal spray system at a rate of from 0.1 to 4.0 grams per second, more preferably at a rate of from 0.4 to 2.0 grams per second, and most preferably at a rate of from 0.5 to 1.0 grams per second.

As discussed above, the thermal spray system preferably utilized in the present invention comprises either a high-velocity oxyfuel thermal spray system, a twin wire arc thermal spray system, or an air plasma thermal spray system. When an air plasma thermal spray system is utilized it is preferred that the primary gas be argon. The secondary gas is typically helium present in an amount of from 0 to 80.0% by volume, more preferably from 0.0 to 70.0% by volume, and most preferably from 0.0 to 50.0% by volume. In an air plasma thermal spray system the secondary gas may also comprise hydrogen.

One of the preferred substrates for application of the catalytic metals using the process of the present invention is to a radiator of a vehicle. The method of the present invention can be used to apply the molten catalytic metal to either the radiator fin stock or to the radiator core after assembly. The advantage of the present method is that the catalytically active layer can be applied to the radiator fin stock at a rate of several hundred feet per minute. The preferred thickness is from 10.0 to 50.0 microns, which has a minimal effect on airflow through the radiator core.

In general, it is preferred that after application the catalytically active surface be further heat treated at a temperature of from 300 to 1100° C. for a period of from 20 minutes to 2 hours in an atmosphere that includes oxygen. More preferably, the heat treatment occurs for a period of from 20 minutes to 1 hour. This post application heat annealing is not a required step to form the catalytically active layer. It is believed that during the heat treatment crystal growth occurs leading to a change in surface morphology. It is believed that following heat treatment this surface will provide a larger effective surface area for reduction of atmospheric pollutants. In addition, the heat treatment promotes enhanced oxidation of the catalytically active layer, thereby enhancing its catalytic activity.

The length and temperature of the heat treatment is determined in part by the identity of the catalytic metal used to form the catalytically active surface, for example, copper is best treated at temperatures of from 300 to 900° C., while manganese is better treated at temperatures of from 400 to 1100° C. Depending on the identity of the catalytic metal utilized it may not be beneficial to engage in a heat treatment following application of the catalytic metal by the thermal spray procedure. Testing of samples produced according to the present invention demonstrates that they are efficient in removal of ozone from air passed over the samples.

Copper Coating

EXAMPLE 1

Copper metal was applied to an aluminum substrate in accordance with the present invention. A Praxair SG-100 plasma gun with a Praxair 730 anode, a Praxair 129 cathode, and a Praxair 112 gas injector was utilized. The primary gas was argon at a pressure of 40 psi (pounds per square inch), the secondary gas was helium at a pressure of 100 psi, and the carrier gas was at a pressure of 30 psi. The current was 600 Amps and the stand-off distance was 152 millimeters.

The horizontal traverse speed of the applicator was 17" per second with a vertical increment of 0.2". Initial grit blasting was done with alumina at a size of 60 and a pressure of 40 psi. The copper utilized was SCM 200RL from X-Form at a size of +15 microns. The powder hopper wheel was rotated at 2.5 rpm with an internal powder feed and no cooling jets were utilized.

Figure 1:
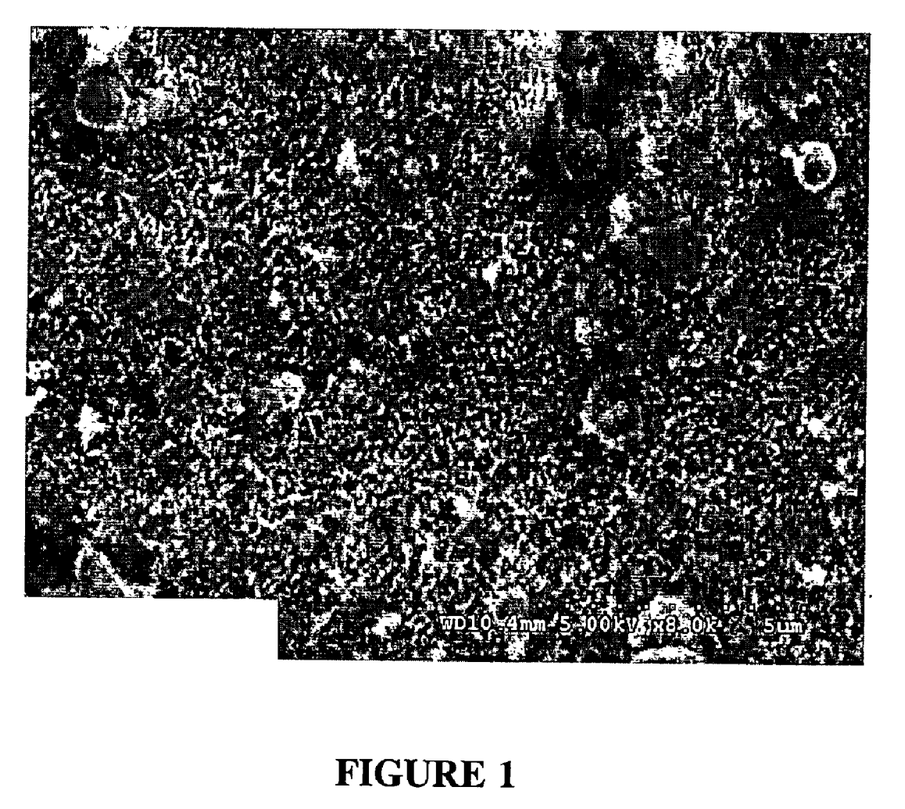
FIG. 1 is a scanning electron photomicrograph of the surface morphology of a catalytically active layer of copper deposited according to the present invention onto an aluminum substrate using a thermal spray system of the present invention.
Figure 2:
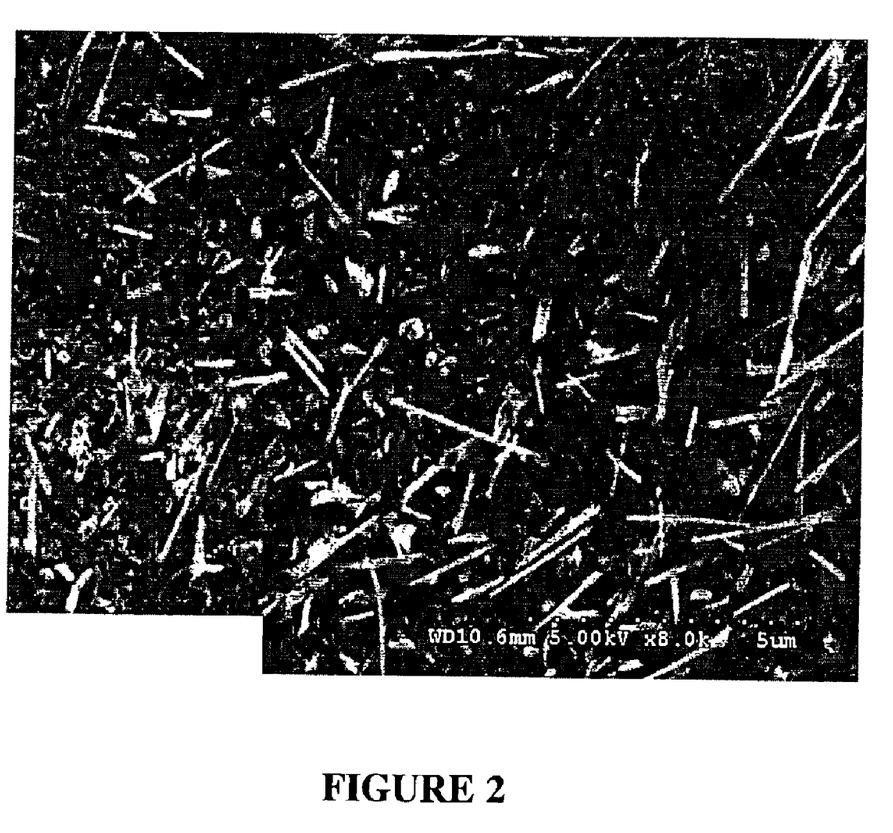
FIG. 2 is a scanning electron photomicrograph of the surface morphology of a coated substrate as in FIG. 1 after a post-application heat treatment at 450° C. for one hour in an atmosphere of air.

FIG. 1 is a scanning electron photomicrograph of the surface morphology of the as sprayed catalytically active copper layer using the method of Example 1. Analysis of the copper coating using both X-ray diffraction and X-ray photoelectron spectroscopy indicated the formation of copper oxide at the outermost surface of the catalytically active layer. FIG. 2 is a scanning electron photomicrograph of the surface morphology of a copper-coated substrate according to the present invention following a post-application heat treatment at 450° C. for one hour in air. The heat treatment results in dramatic growth of the surface and change to the surface morphology, which is believed to lead to an increase in the catalytically active surface area. Again, analysis of the coating using either X-ray diffraction or X-ray photoelectron spectroscopy after heat treatment indicated the presence of copper oxide at the outermost surface of the coating.

Manganese Coating

EXAMPLE 2

Utilizing the same plasma gun and parameters as in Example 1 above, unless noted otherwise, manganese was applied to a substrate surface according to the present invention. The primary gas utilized was argon at a pressure of 40 psi and there was no secondary gas. The system was run at a stand-off distance of 76 millimeters. The powder was Mn-104 from AEE and had a mesh size of from 100 to 325 mesh. The powder feed hopper was run at 2.3 rpm through an internal powder feed and cooling jets were utilized.

Figure 3:
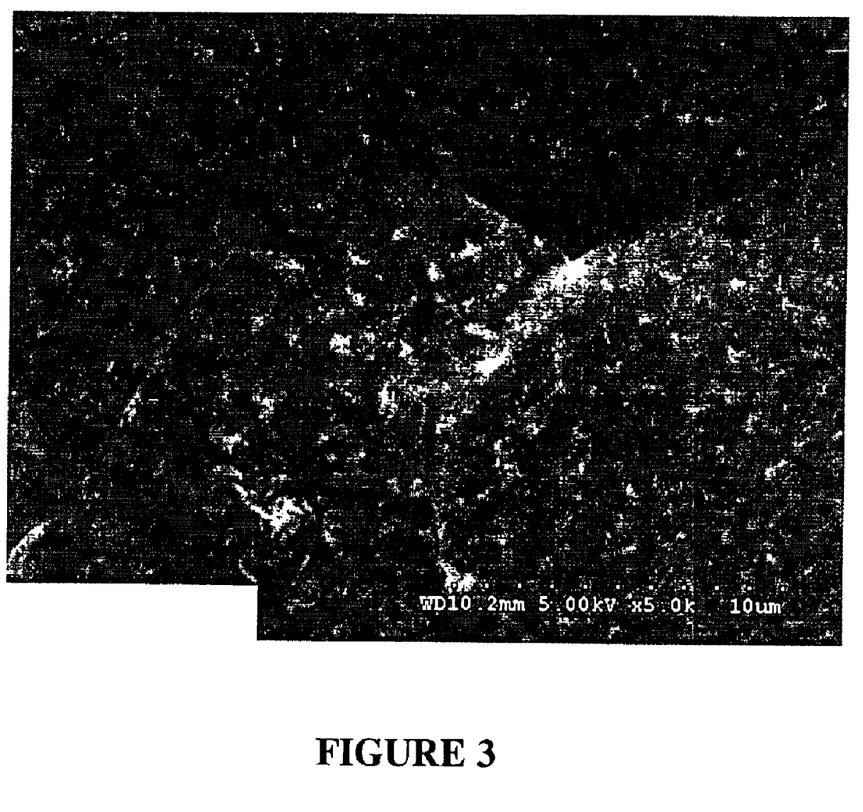
FIG. 3 is a scanning electronic photomicrograph of the surface morphology of a catalytically active layer of manganese deposited according to the present invention onto an aluminum substrate.

FIG. 3 is a scanning electron photomicrograph of the surface morphology of the substrate after coating with manganese according to Example 2. Analysis of this surface using both X-ray diffraction and X-ray photoelectron spectroscopy indicated the formation of catalytically active $MnO_x$ on the outermost surface of the coating.

Figure 4:
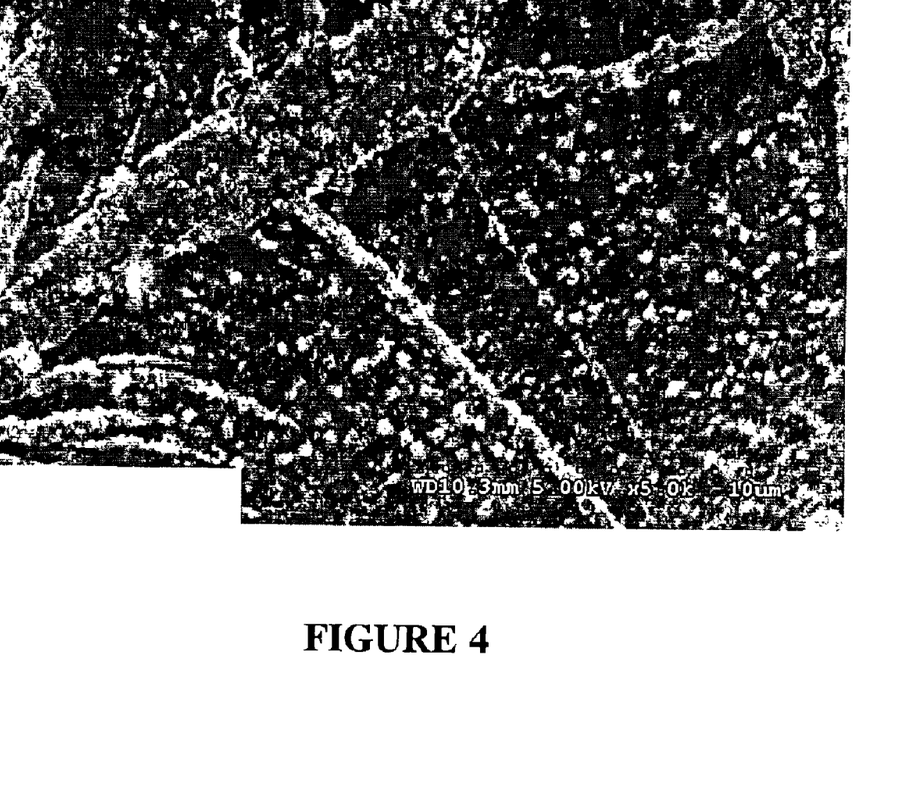
FIG. 4 is a scanning electron micrograph photograph of the surface morphology of a coated substrate as in FIG. 3 after a post-application heat treatment at 450° C. for one hour in an atmosphere of air.

FIG. 4 is a scanning electron photomicrograph of a surface prepared as in FIG. 3 following a post-application heat treatment at 450° C. for one hour in air. Again, the heat treatment increases the growth of the surface area, which may lead to increased catalytically active surface area. Analysis of the surface after heat treatment by X-ray diffraction and X-ray photoelectron spectroscopy again indicated the presence of the desired $MnO_x$ in the outermost surface of the coating.

Ozone Removal Efficiency

Utilizing the procedure described above in Examples 1 and 2, manganese or copper powder was applied to 8" by 8" flat aluminum substrates that were 0.5 millimeters thick. Each sheet was cut into strips 8" long by 1.5" in width. Each strip was folded in a zigzag fashion into a cylindrical form approximately ⅞" in diameter. Each sample was heat treated at 450° C. for one hour. Two pieces of each sample were mounted in a quartz reactor tube for evaluation. A flow rate of 20.0 standard liters per minute, equivalent to a space velocity of 82,000 $hour^{-1}$, or a linear velocity of 0.87 meters per second was utilized. The dry feed contained 0.22 ppm of $O_3$ and 12.5 ppm of CO in pure air. The difference between the upstream and downstream concentrations of ozone divided by the upstream concentration was converted to a percentage and the percent removal was plotted with respect to the temperature of the system.

Figure 5:
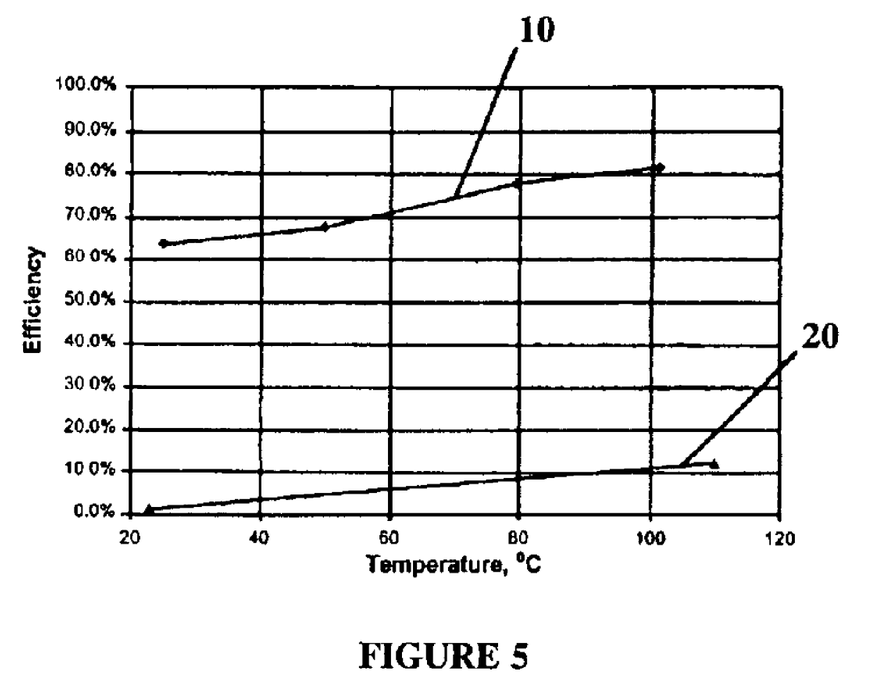
FIG. 5 is a graph of the effect of temperature on ozone removal from air by a substrate coated with manganese according to the present invention.
Figure 6:
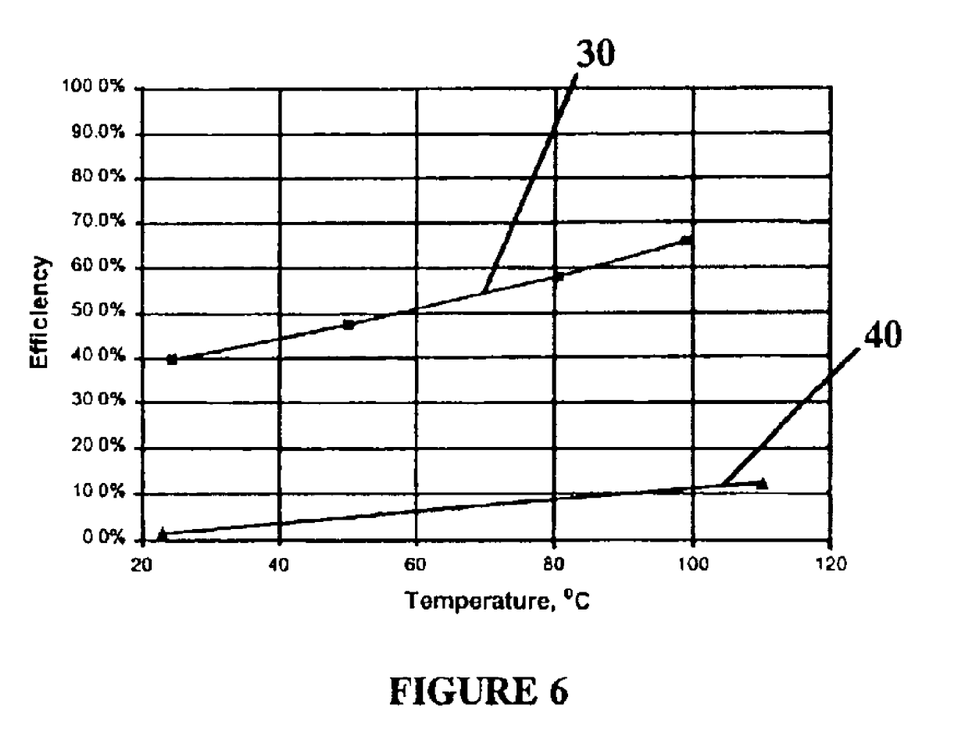
FIG. 6 is a graph of the effect of temperature on ozone removal from air by a substrate coated with copper according to the present invention.

FIG. 5 shows the ozone removal efficiency of the manganese sample. Reference numeral 10 denotes the removal efficiency of the sample itself. Reference numeral 20 denotes the removal efficiency of the aluminum substrate. As can be seen by the figure, the removal of ozone by the manganese-applied substrate is very high ranging from 65 to 73% over a wide temperature range. The removal caused by the aluminum substrate itself was extremely small. In FIG. 6 the removal efficiency of the copper catalytically active layer is shown at reference numeral 30, reference numeral 40 being the removal efficiency of the aluminum substrate. As can be seen the removal of ozone by the copper layer is less than that of the manganese, however, it is still quite high ranging from 40 to 55% over a wide temperature range. The results clearly demonstrate the ozone removal activity of the catalytically active layers prepared according to the present invention.

Manganese Coating

EXAMPLE 3

Manganese was applied to a radiator core utilizing an air plasma spray system. The primary gas was argon at a flow rate of 80 standard cubic feet per hour (scfh), the secondary gas was hydrogen at a flow rate of 5 scfh, and the carrier gas was argon at a flow rate of 12 scfh. The manganese powder was fed at a rate of 0.3 grams per second and the stand-off distance was 120 millimeters. The current was 450 Amps and the traverse speed was 30 centimeters per second. The system resulted in very even coating of the radiator core reaching well into the core itself.

Figure 7:
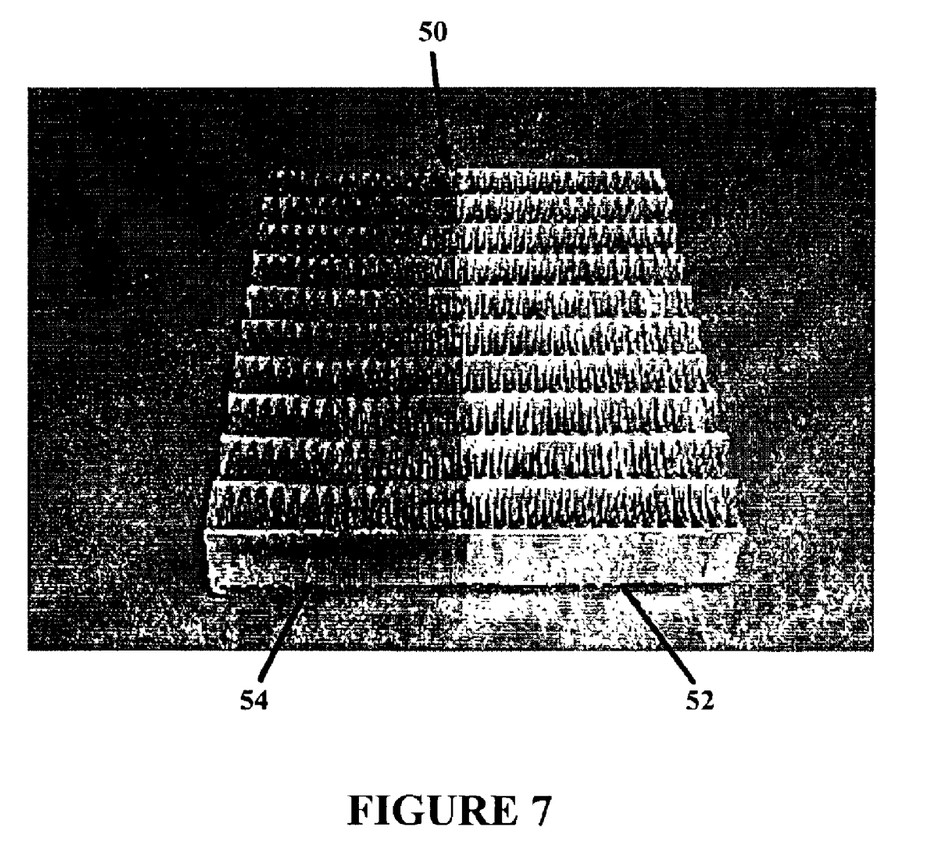
FIG. 7 is a photograph of a radiator core, half of which has been sprayed with manganese according to the present invention.

In FIG. 7 an example of a radiator core coated with the manganese powder as described above is shown generally at 50. One-half of the radiator core 50 was not coated with manganese and is shown at 52, the other half of the radiator core 50 was coated with manganese and is shown at 54. It can be seen that the coating penetrates well into the radiator core 50.

Figure 8:
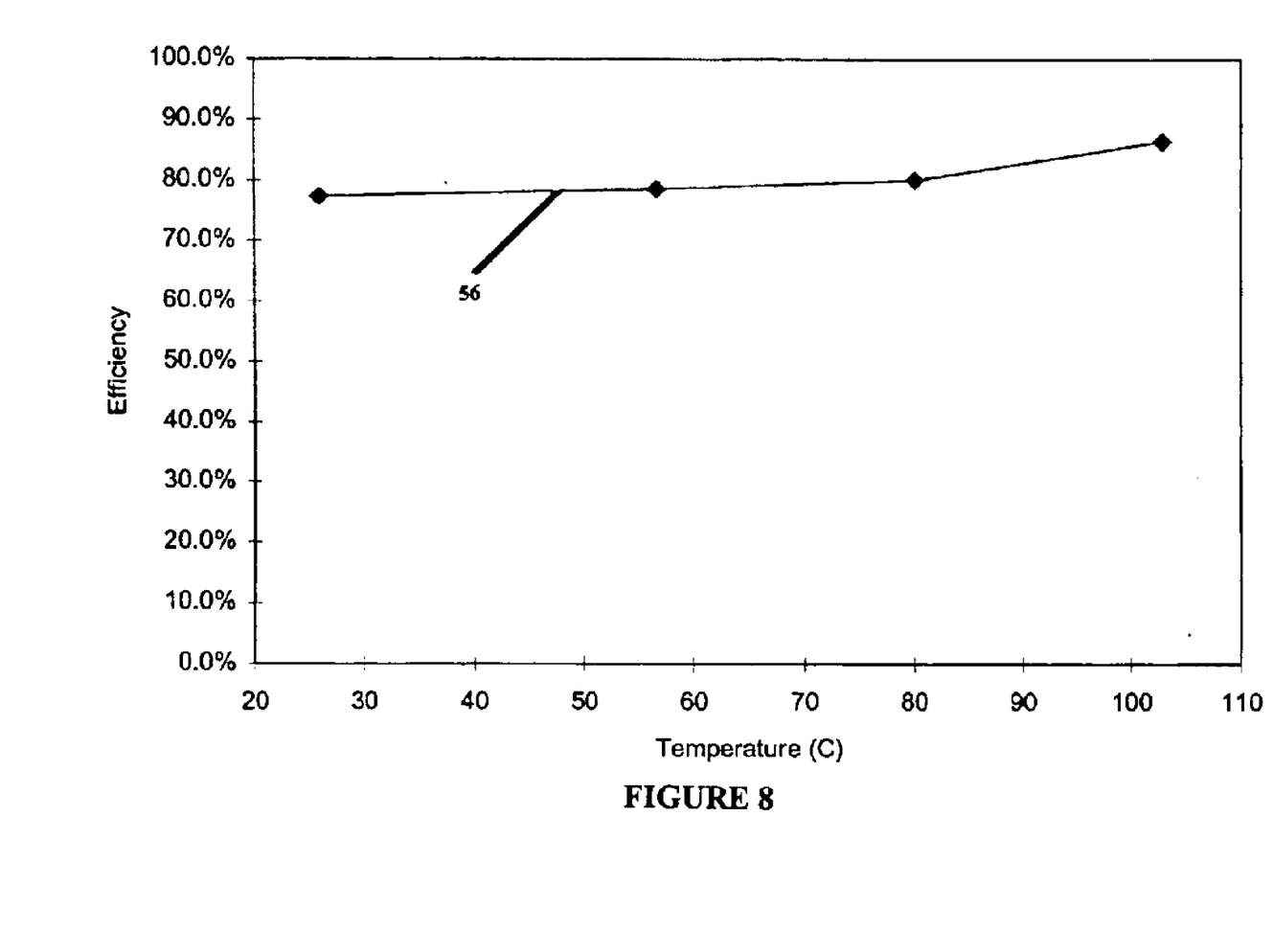
FIG. 8 is a graph of the effect of temperature on ozone removal from air by a radiator core coated with manganese according to the present invention.

Utilizing a radiator core coated as described above the efficiency of the core at removing ozone from an airstream was tested as follows. A flow rate of 10.0 standard liters per minute, which is equivalent to a space velocity of 158, 533 per hour or a linear velocity of 0.86 meters per second was passed through the radiator core. The dry feed of air contained 0.22 parts per million (ppm) of ozone and 12.5 ppm of CO in pure air. The difference between the upstream and the downstream concentration of ozone divided by the upstream concentration was converted to a percentage and called the efficiency. In FIG. 8 a graph is shown at 56 demonstrating the efficiency of removing ozone from air using a manganese-coated radiator core according to the present invention at a series of temperatures. It can be seen that the removal efficiency is largely temperature independent and varies between 76 to 86%, thus demonstrating the efficiency of a radiator core coated according to the present invention.

Copper Coating

EXAMPLE 4

In another example a twin wire arc thermal spray system was utilized to coat a radiator core with copper. The feed stock material was 1/16" in diameter copper wires, the voltage was 30 volts with a current of 220 Amps. The standoff distance was 76 millimeters and the atomizing gas was compressed air at a pressure of 135 psi. The traverse speed was 5" per second. The radiator showed very even coating including deep into the interior of the fin portion of the radiator core.

The method disclosed in the present invention can be utilized to apply these catalytic metals to any substrate capable of being sprayed by a thermal spray process. Such substrates include metals, alloys, and ceramics. Thus, this invention has utilization in preparing catalytically active surfaces in a variety of components not previously possible such as metal surfaces on buildings, metal smokestacks, on billboards, on heating and cooling systems for buildings, and other surfaces exposed to the atmosphere.

The present invention finds special utilization in the application of catalytic metals to surfaces of radiators for vehicles. As discussed in the background of the invention, presently such surfaces are coated with catalytic materials through a multi-step process that includes numerous slurries and baths and, in general, it is difficult to accomplish without utilization of extraneous adhesives, resins, and protective layers.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A method of forming a catalytically active surface on a substrate for treatment of atmospheric pollution comprising the steps of:
   a) providing a feedstock of at least one catalytic metal to a thermal spray system, said thermal spray system forming a molten catalytic metal;
   b) applying said molten catalytic metal from said thermal spray system directly onto a substrate material surface, said molten catalytic metal forming a direct bond to said substrate and forming a catalytically active layer on said substrate material surface, wherein said catalytically active layer is capable of catalyzing the conversion of at least one of ozone, hydrocarbons, or carbon monoxide to oxygen, water, and carbon dioxide, respectively, and wherein said surface and said substrate material are free from binders of said molten catalytic metal.

2. The method of claim 1, wherein step a) comprises providing a catalytic metal comprising copper, manganese, nickel, iron, chromium, zinc, palladium, platinum, rhodium, ruthenium, silver, gold, or mixtures thereof.

3. The method of claim 1, wherein step a) comprises providing a catalytic metal comprising an oxide of copper, an oxide of manganese, an oxide of nickel, an oxide of iron, an oxide of chromium, an oxide of zinc, an oxide of palladium, an oxide of platinum, an oxide of rhodium, an oxide of ruthenium, an oxide of silver, an oxide of gold, or mixtures thereof.

4. The method of claim 1, wherein step a) comprises providing said feedstock as a powder having a nominal diameter of from 5.0 to 250.0 microns.

5. The method of claim 1, wherein step a) comprises providing said feedstock as a powder having a nominal diameter of from 15.0 to 120.0 microns.

6. The method of claim 1, wherein step a) comprises providing said feedstock as a powder having a nominal diameter of from 25.0 to 75.0 microns.

7. The method of claim 1, wherein step a) comprises providing said feedstock as a plurality of wires each having a diameter of from 1/16 to 4/16 of an inch and wherein said thermal spray system is a twin wire arc thermal spray system.

8. The method of claim 1, wherein step b) comprises applying said molten catalytic metal to a thickness of from 10.0 to 50.0 microns onto said substrate material surface.

9. The method of claim 1, where in step a) said thermal spray system heats said feedstock to a temperature of from 0.0 to 400.0 degrees Celsius above the melting point of the feedstock to form said molten catalytic metal.

10. The method of claim 1, where in step a) said thermal spray system heats said feedstock to a temperature of from 0.0 to 250.0 degrees Celsius above the melting point of the feedstock to form said molten catalytic metal.

11. The method of claim 1, where in step a) said thermal spray system heats said feedstock to a temperature of from 0.0 to 100.0 degrees Celsius above the melting point of the feedstock to form said molten catalytic metal.

12. The method of claim 1, further comprising after step b) a step of maintaining said substrate with said catalytically active layer at a temperature of from 300 to 1100 degrees Celsius for a period of from 20 minutes to 2 hours in an atmosphere comprising air.

13. The method of claim 1, wherein step b) comprises applying said molten catalytic metal to said substrate material surface at an angle of from 0.0 to 80.0 degrees, said angle measured relative to a line drawn normal to said substrate material surface.

14. The method of claim 1, wherein step b) comprises applying said molten catalytic metal to said substrate material surface at an angle of from 0.0 to 50.0 degrees, said angle measured relative to a line drawn normal to said substrate material surface.

15. The method of claim 1, wherein step b) comprises applying said molten catalytic metal to said substrate material surface at an angle of from 0.0 to 30.0 degrees, said angle measured relative to a line drawn normal to said substrate material surface.

16. The method of claim 1, wherein step b) comprises applying said molten catalytic metal to said substrate material surface from a stand off distance of from 10.0 to 500.0 millimeters.

17. The method of claim 1, wherein step b) comprises applying said molten catalytic metal to said substrate material surface from a stand-off distance of from 30.0 to 100.0 millimeters.

18. The method of claim 1, wherein step b) comprises applying said molten catalytic metal to said substrate material surface from a stand-off distance of from 30.0 to 80.0 millimeters.

19. The method of claim 1, wherein step b) comprises accelerating said molten catalytic metal to a velocity of from 50.0 to 900.0 meters per second to apply said molten catalytic metal to said substrate material surface.

20. The method of claim 1, wherein step b) comprises accelerating said molten catalytic metal to a velocity of from 200.0 to 900.0 meters per second to apply said molten catalytic metal to said substrate material surface.

21. The method of claim 1, wherein step b) comprises accelerating said molten catalytic metal to a velocity of from 400.0 to 600.0 meters per second to apply said molten catalytic metal to said substrate material surface.

22. The method of claim 1, wherein step a) comprises providing said feedstock to said thermal spray system at a rate of from 0.1 to 4.0 grams per second.

23. The method of claim 1, wherein step a) comprises providing said feedstock to said thermal spray system at a rate of from 0.4 to 2.0 grams per second.

24. The method of claim 1, wherein step a) comprises providing said feedstock to said thermal spray system at a rate of from 0.5 to 1.0 grams per second.

25. The method of claim 1, wherein step a) comprises providing a high-velocity oxyfuel thermal spray system as said thermal spray system.

26. The method of claim 1, wherein step a) comprises providing a plasma thermal spray system as said thermal spray system.

27. The method of claim 26, wherein step b) comprises applying said molten catalytic metal to said substrate material surface using argon as the primary gas.

28. The method of claim 26, wherein step b) comprises providing helium as the secondary gas at a level of from 0.0 to 80.0 percent by volume.

29. The method of claim 26, wherein step b) comprises providing helium as the secondary gas at a level of from 0.0 to 70.0 percent by volume.

30. The method of claim 26, wherein step b) comprises providing helium as the secondary gas at a level of from 0.0 to 50.0 percent by volume.

31. The method of claim 1, wherein step b) comprises applying the molten catalytic metal to one of a radiator fin stock or a radiator core as said substrate material surface.

32. The method of claim 31, further comprising after step b) a step of maintaining said substrate with said catalytically active layer at a temperature of from 300 to 1100 degrees Celsius for a period of from 20 minutes to 2 hours in an atmosphere comprising air.

33. The method of claim 1, wherein step a) comprises providing a catalytic metal comprising copper, manganese, nickel, iron, chromium, zinc, palladium, platinum, rhodium, ruthenium, silver, gold, an oxide of copper, an oxide of manganese, an oxide of nickel, an oxide of iron, an oxide of chromium, an oxide of zinc, an oxide of palladium, an oxide of platinum, an oxide of rhodium, an oxide of ruthenium, an oxide of silver, an oxide of gold, or mixtures thereof.

\* \* \* \* \*